United States Patent
Mudaly

(10) Patent No.: US 9,675,905 B2
(45) Date of Patent: Jun. 13, 2017

(54) DEFOAMER COMPOSITIONS AND METHODS OF USING THE SAME

(71) Applicant: Buckman Laboratories International, Inc., Memphis, TN (US)

(72) Inventor: Glenn Mudaly, Baie-d'Urfe (CA)

(73) Assignee: Buckman Laboratories International, Inc., Memphis, TN (US)

(*) Notice: Subject to any disclaimer, the term of this patent is extended or adjusted under 35 U.S.C. 154(b) by 0 days.

(21) Appl. No.: 14/662,252

(22) Filed: Mar. 19, 2015

(65) Prior Publication Data

US 2015/0273359 A1 Oct. 1, 2015

Related U.S. Application Data

(60) Provisional application No. 61/971,561, filed on Mar. 28, 2014.

(51) Int. Cl.
| | | |
|---|---|---|
| *B01D 19/04* | (2006.01) | |
| *D21H 17/10* | (2006.01) | |
| *D21H 17/13* | (2006.01) | |
| *D21H 17/15* | (2006.01) | |
| *D21H 17/68* | (2006.01) | |
| *D21H 21/12* | (2006.01) | |
| *D21H 21/24* | (2006.01) | |

(52) U.S. Cl.
CPC ..... *B01D 19/0418* (2013.01); *B01D 19/0409* (2013.01); *D21H 17/10* (2013.01); *D21H 17/13* (2013.01); *D21H 17/15* (2013.01); *D21H 17/68* (2013.01); *D21H 21/12* (2013.01); *D21H 21/24* (2013.01)

(58) Field of Classification Search
CPC ........... B01D 19/0418; B01D 19/0409; D21H 17/68; D21H 21/24; D21H 21/12; D21H 17/15; D21H 17/10; D21H 17/13; D21C 3/28
USPC .................................. 516/116; 162/76, 158
See application file for complete search history.

(56) References Cited

U.S. PATENT DOCUMENTS

| | | | | |
|---|---|---|---|---|
| 2,306,222 A | * | 12/1942 | Patnode | C03C 17/30 106/287.14 |
| 2,412,470 A | * | 12/1946 | Norton | C04B 41/009 106/287.1 |
| 4,024,072 A | * | 5/1977 | Shane | B01D 19/0404 516/123 |
| 4,123,383 A | | 10/1978 | Ihde, Jr. | |
| 5,261,927 A | * | 11/1993 | Walger | B01D 19/0404 516/116 |
| 5,866,041 A | | 2/1999 | Svarz et al. | |
| 6,875,801 B2 | | 4/2005 | Shendy et al. | |
| 8,088,842 B2 | | 1/2012 | Shendy et al. | |
| 8,317,918 B1 | | 11/2012 | Kuo | |
| 8,377,193 B2 | * | 2/2013 | Lortz | B01F 17/0007 516/34 |
| 2004/0044089 A1 | * | 3/2004 | Lane | B01D 19/0404 516/113 |
| 2004/0224869 A1 | * | 11/2004 | Lane | B01D 19/0404 510/347 |
| 2005/0164884 A1 | * | 7/2005 | Bramati | A01N 25/02 504/206 |
| 2006/0128816 A1 | | 6/2006 | Cheng et al. | |
| 2009/0301350 A1 | * | 12/2009 | Tontrup | C04B 14/06 106/442 |
| 2010/0212847 A1 | | 8/2010 | Hamers et al. | |

FOREIGN PATENT DOCUMENTS

| | | |
|---|---|---|
| CA | 1061677 | 9/1979 |
| JP | 2001049089 A | 2/2001 |
| MX | 2011002241 A | 10/2012 |
| WO | 0141909 A1 | 6/2001 |
| WO | 0141912 A2 | 6/2001 |
| WO | WO 2009/121680 A1 * | 10/2009 |
| WO | 2012018749 A1 | 2/2012 |

OTHER PUBLICATIONS

Evonik Industries, Technical Brochure 11-1-(Jul. 2006), "Basic characteristics of AEROSIL® fumed silica Technical Bulletin Fine Particles 11", (Jul. 2006), Evonik Degussa Corporation, Inorganic Materials, Parsippany, NJ, USA, pp. 1, 3-5, 36-39, 47-48, 53, and 68-71.*

Hodgdon and Kaler, "Hydrotropic solutions," Current Opinion in Colloid & Interface Science, 12 (2007) 121-128.*

International Search Report and Written Opinion issued in corresponding International Patent Application No. PCT/US2015/021352 dated Jun. 11, 2015 (11 pages).

* cited by examiner

*Primary Examiner* — Daniel S Metzmaier
(74) *Attorney, Agent, or Firm* — Kilyk & Bowersox, P.L.L.C.

(57) ABSTRACT

Defoamer compositions are described and the use of defoamer compositions in paper and pulp mills is described, especially for use at the brown stock washing steps in a pulp mill. The defoamer composition comprises:
  a) about 20 wt % to about 90 wt % of at least one organophosphorous component (e.g., compound or polymer, n-tributoxyethyl phosphate);
  b) about 1 wt % to about 10 wt % of at least one silane treated silica;
  c) about 0.5 wt % to about 10 wt % of at least one surfactant that is anionic or non-ionic; and
  d) optionally, water or an aqueous liquid.

17 Claims, 2 Drawing Sheets

DEFOAMER COMPOSITIONS AND METHODS OF USING THE SAME

This application claims the benefit under 35 U.S.C. §119 (e) of prior U.S. Provisional Patent Application No. 61/971,561, filed Mar. 28, 2014, which is incorporated in its entirety by reference herein.

BACKGROUND OF THE INVENTION

The present invention relates to controlling foaming in paper and pulp mills. The present invention further relates to defoamer compositions that can be used to treat pulp or black liquor in pulp processing, or used to treat process waters in pulp and paper making processes.

In various steps of pulping and paper making, the creation of unwanted foam can occur. This generally occurs due to the various chemicals used in the pulp and paper making processes. One particular area that faces undesirable foam formation is in the pulp washing stage where wash water is used to wash the pulp and remove pulping chemicals and lignin. Previous defoaming technology, especially for pulp washing or brown stock washing stages, involved the use of petroleum based products such as hydrocarbon based oils, high melting point waxes, and one or more components that are treated with silicone oil. While these defoamer compositions have been considered effective in the controlling of foam, certain pulp and paper manufacturers wish to greatly avoid the presence of waxes and/or silicone oils since typically a residual of these chemicals cannot be removed from the pulp and upon testing are found to be present in the pulp. Specifically, the addition of oil based types of defoamers can cause a negative impact and/or an increase in pitch or dirt deposits in the paper making and pulp processing stages. For instance, these deposits can contain large amounts of high molecular weight fractions of oils and insoluble amide waxes which can cause fouling of wires, felts, and other components in subsequent paper making operations. Also, if the silicone components that are in the defoamer are not properly dispersed into the black liquor system and therefore not washed out during the washing process, this can have a negative effect on the final paper sheet that is made and any silicone carryover onto the paper products can affect the overall quality of the pulp and eventually the paper product thus downgrading the quality of the product.

Accordingly, there is a need in the paper making and pulp processing industry to develop defoamer compositions which are preferably free of silicone oil and/or free of high molecular weight wax and yet still achieve comparable defoaming activity in the paper and pulp mill.

SUMMARY OF THE PRESENT INVENTION

A feature of the present invention is to control foaming in one or more stages of pulp processing and/or paper making.

Another feature of the present invention is to provide defoamer compositions which are free of silicone oil.

A further feature of the present invention is to provide defoamer compositions which are free of high molecular weight waxes.

To achieve these and other advantages and in accordance with the purposes of the present invention, as embodied and described herein, the present invention relates to a defoamer composition. The defoamer composition includes at least one organophosphorous component, at least one silane treated silica, and at least one surfactant that is anionic or non-ionic, and optionally, water or an aqueous liquid.

The present invention further relates to methods to control foaming in a pulp process or paper making process using one or more of the defoamer compositions of the present invention.

The present invention further relates to a method to control foaming at one or more pulp washing stages of a pulping process, such as at one or more brown stock washers.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

It is to be understood that both the foregoing general description and the following detailed description are exemplary and explanatory only and intended to provide a further explanation of the present invention, as claimed.

DETAILED DESCRIPTION OF THE PRESENT INVENTION

Figure 1:
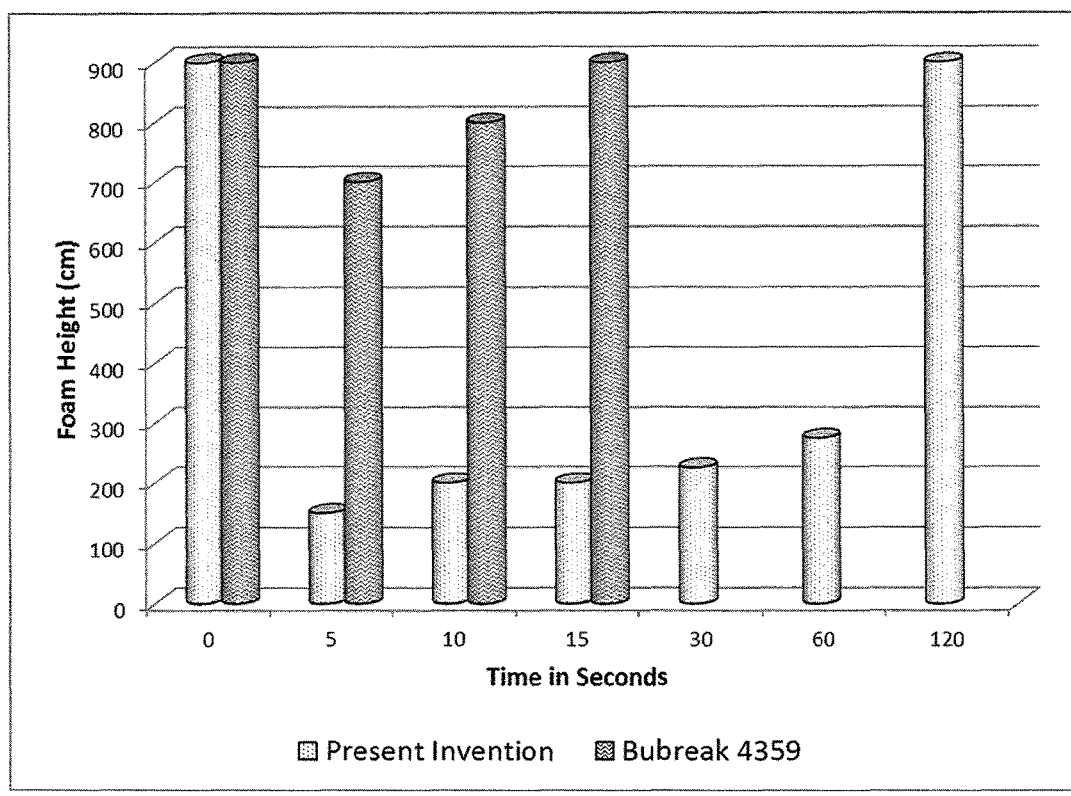
FIG. 1 and FIG. 2 are bar graphs showing experimental results of one of the defoamer compositions of the present invention compared to conventional and silicone based defoamer compositions. The bar graph reflects the control of foam by measuring foam height (in cm) over time (in seconds).

The present invention relates to a defoamer composition or formulation. The defoamer composition or formulation is especially useful in controlling foam in one or more stages of a pulping operation and/or paper making operation. The defoamer compositions of the present invention are especially useful in one or more pulp washing steps also considered a brown stock washing stage.

The defoamer composition or formulation of the present invention comprises, consists essentially of, consists of, or includes:

a) at least one organophosphorous component (e.g., compound or polymer);
b) at least one silane treated silica;
c) at least one surfactant that is anionic or non-ionic; and
d) optionally, water or an aqueous liquid.

The organophosphorous component can be present in the defoamer composition in an amount of from about 20 wt % to about 90 wt %, or from about 30 wt % to about 90 wt %, or from about 40 wt % to about 90 wt %, or from about 50 wt % to about 90 wt %, or from about 60 wt % to about 90 wt %, or from about 70 wt % to about 98 wt %, or from about 75 wt % to about 95 wt %, based on the total weight of the defoamer composition.

The silane treated silica can be present in an amount of from about 1 wt % to about 10 wt %, such as from about 2 wt % to about 8 wt %, from about 3 wt % to about 8 wt %, from about 3 wt % to about 7 wt %, or from about 5 wt % to about 10 wt %, based on the total weight of the defoamer composition.

The surfactant can be present in the defoamer composition in an amount of from about 0.5 wt % to about 10 wt %, from about 1 wt % to about 10 wt %, from about 3 wt % to about 8 wt %, from about 5 wt % to about 10 wt %, or from about 1 wt % to about 5 wt %, based on the total weight of the defoamer composition.

The balance, if any, in the defoamer composition can be water or an aqueous liquid, like alcohol. The water can be present in an amount from 0 wt % to about 35 wt %, or from about 1 wt % to 30 wt %, of from about 2 wt % to 25 wt %, or from about 5 wt % to about 20 wt %, based on the total weight of the defoamer composition.

When water is present, the water is dispersed in the other ingredients of the defoamer compositions of the present invention. In other words, when water is present, the defoamer composition is considered a water extended formulation which can be considered a water-in-oil composition. The overall defoamer composition of the present invention, even when water is present, is considered water insoluble. Through rapid mixing and preferably elevated temperatures, above 25° C. and more preferably above 35° C., the water can be effectively dispersed into the water insoluble components of the defoamer composition. For purposes of the present invention, the water insoluble components, especially the organophosphorous component, can be considered the continuous phase and the water, if present, can be considered the non-continuous phase.

With regard to the organophosphorous compound, one or more different types of organophosphorous components, such as compounds, can be used. The organophosphorous component can be an alkyl-containing phosphorous compound, such as a $C_1$ to $C_{12}$ alkyl containing phosphorous compound. The organophosphorous compound can be an alkyl phosphate, a phosphate ester, an alkyl phosphite, or any combination thereof.

Specific examples of the organophosphorous component that can be present in the defoamer composition include, but are not limited to, n-tributyl phosphate, n-tributoxyethyl phosphate, tris(2-ethylhexyl)phosphate, a phosphate ester, triisooctyl phosphite, tri-isobutyl phosphate, tri-phenyl phosphate, or any combination thereof.

The organophosphorous component, such as the organophosphorous compound, can be considered the carrier medium of the defoamer composition. The organophosphorous component while being a carrier also can optionally contribute to defoaming properties. Preferably, the organophosphorous compound is water insoluble.

The organophosphorous compound in combination with the silane treated silica has been shown, based on the studies of the present invention, to provide synergy with regard to defoaming activity. In other words, the combination of the organophosphorous compound with the silane treated silica of the defoamer composition of the present invention provides greater than an additive effect with regard to defoaming characteristics.

With regard to the silane treated silica, one or more silane treated silicas can be used in the defoamer composition of the present application. The silane treated silica generally is in particulate form and is present, such as suspended, in the defoamer composition.

The silane treated silica can be, for example, an organosilane treated silica. The organosilane can be, for instance, an alkyl-Si—, for instance a $CH_3Si$—. The silica can be treated with, for example, hexamethyldisilazane, dimethyldichlorosilane, octamethylcyclotetrasiloxane, methacrylsilane, octyltriethoxysilane, hexadecylsilane, octylsilane, mono-di- or tri-alkoxysilanes, polydimethylsiloxane, cyclicsilazane or any combination thereof.

The silica or silane treated silica can have a BET surface area from about 80 $m^2/g$ to about 290 $m^2/g$, for instance from about 100 $m^2/g$ to about 260 $m^2/g$ or from about 150 $m^2/g$ to 225 $m^2/g$ or from about 175 $m^2/g$ to about 225 $m^2/g$.

Commercial examples of the silane treated silica include Wacker HDK2000, Evonik silane-treated silicas, such as AEROSIL R972, R104, R106, R202, R208, R812S, R8200, R974, R805, R812, R816, R7200, and R711, and/or ZEOFREE 80D, and/or Cabot's CAB-O-SIL silicas, such as CAB-O-SIL TG-308F, TG-709F, TG-7120, TG-810G, TG-811F, TG-815F, TG-820F, TG-828F, TS-530, TS-610, TS-622, TS-720, TS-530D, TG-C190, TG-C243, TG-C390, and TG-C413.

As stated, the surfactant can be anionic or non-ionic. More than one type of surfactant can be used.

Examples of non-ionic surfactants include a polyglycol ester, a sugar ester, a block copolymer ester of polyoxypropylene and polyoxyethylene, an alcohol ethoxylate, a polyalkylene glycol ester, a sorbitan ester, an amine ethoxylate, an ester ethoxylate, an alkylolamide ethoxylate, a lanolin ethoxylate, an alkylphenol ethoxylate, or any combination thereof.

Examples of anionic surfactants include a phosphate ester, a sulphosuccinate, an ether sulphate, an alcohol sulphate, an alkylaryl sulphonate, an alkane/olefin sulphonate, or a petroleum sulphonate or any combination thereof.

With regard to preparing the defoamer compositions of the present invention, the components can be mixed together. This mixing can occur at elevated temperatures such as from about 50° C. to about 90° C. The mixing can occur for at least 10 minutes, such as from 10 minutes to 10 hours or more. Generally, the mixing occurs for from about one hour to about five hours. Afterwards, the mixture can be cooled down to ambient temperature (from about 15° C. to about 25° C.).

The defoamer compositions of the present invention can be used at any stage in a pulp pulping process or paper making process where foaming needs to be controlled. The defoamer compositions of the present invention are especially effective in the pulp washing stages of a pulping process. The pulp washing step is also considered the brown stock washing process or stage. The defoamer compositions of the present invention can be used at a dosage amount of from about 0.4 kg/metric ton of wet pulp to about 1 kg/metric ton of wet pulp.

The use of the defoamer compositions of the present invention can be used in chemical pulp processing and mechanical pulp processing. The defoamer compositions of the present invention can be used to control foam with a variety of different types of brown stock washers such as diffuser washing systems, press type washers, counter current flow stock washers, rotary vacuum drum washers, double wire press washers, and diffusion washers. Once the pulp has been washed and screened, it is considered brown stock.

During brown stock washing, the pulp is subjected to washing with generally clean hot water. During this brown stock washing step, the black liquor which is the chemicals and lignin present with the pulp is washed from the pulp and optionally recovered. The defoamer compositions of the present invention can be applied to control foam in various ways, such as by spraying the pulp with the defoamer composition, mixing the defoamer composition with the wash water or shower water, adding or spraying the black liquor once it is washed off of the pulp, or any combinations thereof.

The defoamer composition can be sprayed into or mixed into the pulp slurry or pulp stock. The defoamer composition can be applied to the filtrate tank or to the cleaners, or at any point in between.

As an option, the defoamer compositions of the present invention are silicone free or essentially silicone free. As an option, there is no silica treated with silicone oil and/or there is no silicone oil present in the composition. As an option, no silicone polyether surfactants or other silicone containing surfactants are used in the composition. As an option, no silicone defoaming compounds are used or present in the composition.

As an option, the defoamer compositions of the present invention are free or essentially free of hydrocarbon oils such as mineral oils. As an option, the defoamer compositions of the present invention are free or essentially free of petroleum products. Thus, no hydrocarbon based oils are preferably present in the defoamer compositions of the present invention.

As an option, the defoamer compositions of the present invention preferably contain no ethylenebis(stearamide) (EBS).

Preferably, the defoamer compositions of the present invention are free or essentially free of any waxes especially high melting point waxes such as having a melting point of 100° C. to about 140° C.

As an option, the defoamer compositions of the present invention are essentially free or free of silicone containing products.

One or more or all of the options described herein can be adopted in the defoamer composition.

For purposes of the present invention, the term "essentially free" means less than 0.1 wt % based on the total weight of the defoamer composition. More preferably, essentially free or free means that there are no detectable ppm levels of the ingredient.

The present invention will be further clarified by the following examples, which are intended to be exemplary of the present invention.

EXAMPLES

Example 1

To test the defoamer compositions of the present invention and other defoamer compositions, a recirculation rig was used which is an accepted laboratory method to evaluate defoamers for pulp mill use. The recirculation rig involves the use of a foam generator with aspirator. For the experiments below, a black liquor sample from a first stage filtrate from a pulp mill was obtained. The black liquor was heated to the standard operating temperature. The black liquor was then added to the cylinder on the foam generator with aspirator to a 400-ml level. Then, a micropipette with the defoamer composition to be tested was used to introduce the defoamer composition to the black liquor. Particularly, the foam generator was started and the foam level of the black liquor was allowed to build to the 700-ml level. At this point, the defoamer composition was injected using the micropipette directly into the recirculation stream being careful not to touch the sides of the cylinder. While injecting the defoamer, a stop watch is immediately started and the lowest level of foam in terms of ml's was recorded. The lowest foam drop, time wise, was recorded and was considered the knockdown portion of the test. The foam levels are continually monitored in seconds when the foam height reaches 600-ml, 700-ml, 800-ml, and 900-ml. If the foam level surpasses the 900-ml level, the test is stopped and the time recorded to surpass 900-ml is recorded. This portion of the test measures suppression and the longer and the lower the foam is suppressed, the better. Once the test has reached 180 seconds, the foam height is recorded and the generator turned off but monitoring is continued for an additional two minutes watching the foam collapse. After two minutes has expired, the depth of the foam layer in ml's is recorded.

In this experiment, a defoamer composition of the present invention was prepared using the following ingredients:

| Present Invention | wt % (approx.) |
|---|---|
| TBEP (n-tributoxyethyl phosphate) | 70 |
| HMDZ and alkylsilane treated silicas | 6 |
| DOSS (dioctylsulfosuccinate anionic) | 2 |
| Water (balance) | |

Figure 2:
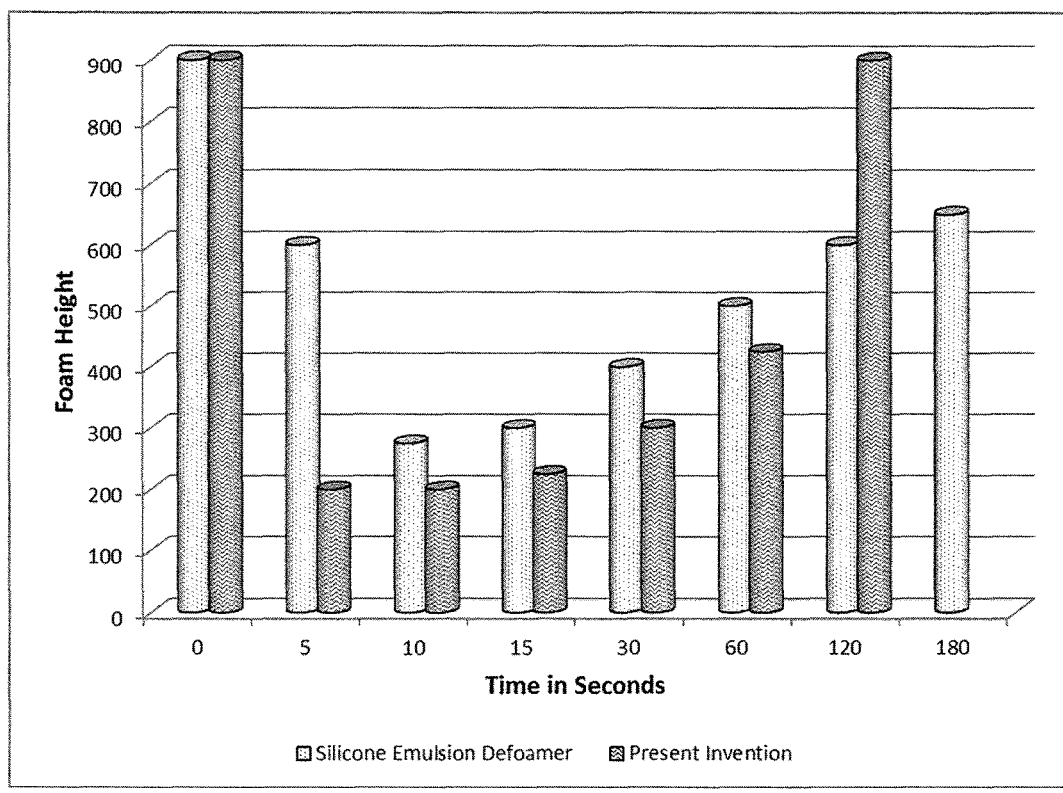

These ingredients were mixed together and heated for 30 minutes at a temperature of 50° C. This created a water extended defoamer composition that essentially dispersed the water into the water insoluble parts of the defoamer composition. As a comparison, a commercially available defoamer composition, BUBREAK 4359 defoamer composition from Buckman Laboratories International was used, which was considered a water extended silica and oil based defoamer composition. Comparison of the present invention with the BUBREAK 4359 is shown in FIG. 1. As a further comparison, the present invention was compared to a silicone emulsion defoamer composition that contained silicone with surfactant. The results of this defoamer testing is shown in FIG. 2.

In each case, it can be seen that the defoamer compositions of the present invention were effective in reducing or controlling foam height. This is especially impressive considering that the defoamer compositions of the present invention did not contain oil based products or silicone based products or waxes. In addition, it is noted that the present invention compared to the BUBREAK 4359 not only controlled foaming but controlled foaming for a longer period of time than the BUBREAK 4359, and this was also true for the present invention compared to the silicone emulsion defoamer that contained silicone as shown in FIG. 2. Thus, with the present invention, not only was foam height controlled, but duration of controlling the foam height was much improved compared to the other comparative formulations.

The present invention includes the following aspects/embodiments/features in any order and/or in any combination:

1. A defoamer composition comprising:
   a) at least one organophosphorous component;
   b) at least one silane treated silica;
   c) at least one surfactant that is anionic or non-ionic; and
   d) optionally, water.

2. The defoamer composition of any preceding or following embodiment/feature/aspect, wherein said at least one organophosphorous component is an organophosphorous compound.

3. The defoamer composition of any preceding or following embodiment/feature/aspect, wherein said organophosphorous component is present in an amount of from about 20 wt % to about 99 wt %, based on the total weight of said defoamer composition.

4. The defoamer composition of any preceding or following embodiment/feature/aspect, wherein said organophosphorous component is an alkyl containing phosphorous compound.

5. The defoamer composition of any preceding or following embodiment/feature/aspect, wherein said organophosphorous component is n-tributyl phosphate, n-tributoxyethyl phosphate, tris(2-ethylhexyl)phosphate, phosphate esters, triisooctyl phosphite, tri-isobutyl phosphate, tri-phenyl phosphate, or any combination thereof.

6. The defoamer composition of any preceding or following embodiment/feature/aspect, wherein said silane treated silica is an organosilane treated silica.

7. The defoamer composition of any preceding or following embodiment/feature/aspect, wherein said silane in the silane treated silica is $CH_3Si$—.

8. The defoamer composition of any preceding or following embodiment/feature/aspect, wherein said silane treated silica has a BET surface area of from about 80 $m^2/g$ to 290 $m^2/g$.

9. The defoamer composition of any preceding or following embodiment/feature/aspect, wherein said silane treated silica is a silica treated with hexamethyldisilazane, dimethyldichlorosilane, methacrylsilane, hexadecylsilane, octylsilane, mono-di- or tri-alkoxysilanes, or any combination thereof.

10. The defoamer composition of any preceding or following embodiment/feature/aspect, wherein said silane treated silica is present in an amount of from about 1 wt % to about 10 wt %, based on the total weight of said defoamer composition.

11. The defoamer composition of any preceding or following embodiment/feature/aspect, wherein said surfactant is anionic.

12. The defoamer composition of any preceding or following embodiment/feature/aspect, wherein said surfactant is non-ionic.

13. The defoamer composition any preceding or following embodiment/feature/aspect, wherein said surfactant is present in an amount of from about 1 wt % to about 5 wt %, based on the total weight of said defoamer composition.

14. The defoamer composition of any preceding or following embodiment/feature/aspect, wherein said surfactant is present in an amount of from about 0.5 wt % to about 10 wt %, based on the total weight of said defoamer composition.

15. The defoamer composition of any preceding or following embodiment/feature/aspect, wherein said surfactant is a polyglycol ester, a sugar ester, a block copolymer ester of polyoxypropylene and polyoxyethylene, an alcohol ethoxylate, a polyalkylene glycol ester, a sorbitan ester, an amine ethoxylate, an ester ethoxylate, an alkylolamide ethoxylate, a lanolin ethoxylate, or an alkylphenol ethoxylate, or any combination thereof 16. The defoamer composition of any preceding or following embodiment/feature/aspect, wherein said surfactant is a phosphate ester, a sulphosuccinate, an ether sulphate, an alcohol sulphate, an alkylaryl sulphonate, an alkane/olefin sulphonate, or a petroleum sulphonate or any combination thereof.

17. The defoamer composition of any preceding or following embodiment/feature/aspect, wherein said defoamer composition is free of silicone oil.

18. The defoamer composition of any preceding or following embodiment/feature/aspect, wherein said defoamer composition is free of silicone or silicone containing products.

19. The defoamer composition of any preceding or following embodiment/feature/aspect, wherein said defoamer composition is free of waxes.

20. The defoamer composition any preceding or following embodiment/feature/aspect, wherein said defoamer composition is free of petroleum products.

21. A method to control foaming during a paper making process, said method comprising applying the defoamer composition of any preceding or following embodiment/feature/aspect to one or more locations in a paper making mill wherein said defoamer composition is applied to process waters present in said paper mill.

22. A method to control foaming in a pulp mill that includes at least one brown stock washer, wherein said method comprises applying the defoamer composition of any preceding or following embodiment/feature/aspect to the wet pulp, brown stock, shower water, and/or black liquor in the vicinity of the brown stock washer in an amount sufficient to control foaming during brown stock washing.

23. The method of any preceding or following embodiment/feature/aspect, wherein said defoamer composition is applied at a dosage of from about 0.4 kg per metric ton of wet pulp to about 1 kg per metric ton of wet pulp.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A defoamer composition comprising:
    a) at least one organophosphorous component, wherein said organophosphorous component is n-tributyl phosphate, n-tributoxyethyl phosphate, tris(2-ethylhexyl) phosphate, triisooctyl phosphite, tri-isobutyl phosphate, tri-phenyl phosphate, or any combination thereof, wherein said organophosphorous component is present in an amount of from about 20 wt % to about 99 wt %, based on the total weight of said defoamer composition;
    b) at least one silane treated silica, wherein said silane treated silica is present in an amount of from about 1 wt % to about 10 wt %, based on the total weight of said defoamer composition;
    c) at least one surfactant that is anionic or non-ionic, wherein said surfactant is a polyglycol ester, a sugar ester, a block copolymer ester of polyoxypropylene and polyoxyethylene, an alcohol ethoxylate, a polyalkylene glycol ester, a sorbitan ester, an amine ethoxylate, an ester ethoxylate, an alkylolamide ethoxylate, a lanolin ethoxylate, or an alkylphenol ethoxylate, a sulphosuccinate, an ether sulphate, an alcohol sulphate, an alkylaryl sulphonate, an alkane/olefin sulphonate, or a petroleum sulphonate, or any combination thereof, wherein said surfactant is present in an amount of from about 0.5 wt % to about 10 wt %, based on the total weight of said defoamer composition; and d) optionally, water.

2. The defoamer composition of claim 1, wherein said at least one organophosphorous component is an organophosphorous compound.

3. The defoamer composition of claim 1, wherein said organophosphorous component is an alkyl containing phosphorous compound.

4. The defoamer composition of claim 1, wherein said silane treated silica is an organosilane treated silica.

5. The defoamer composition of claim 1, wherein said silane in the silane treated silica is $CH_3Si-$.

6. The defoamer composition of claim 1, wherein said silane treated silica has a BET surface area of from about 80 $m^2/g$ to 290 $m^2/g$.

7. The defoamer composition of claim 1, wherein said silane treated silica is a silica treated with hexamethyldisilazane, dimethyldichlorosilane, methacrylsilane, hexadecylsilane, octylsilane, mono-di- or tri-alkoxysilanes, or any combination thereof.

8. The defoamer composition of claim 1, wherein said surfactant is anionic.

9. The defoamer composition of claim 1, wherein said surfactant is non-ionic.

10. The defoamer composition of claim 1, wherein said surfactant is present in an amount of from about 1 wt % to about 5 wt %, based on the total weight of said defoamer composition.

11. The defoamer composition of claim 1, wherein said defoamer composition is free of silicone oil.

12. The defoamer composition of claim 1, wherein said defoamer composition is free of silicone or silicone containing products.

13. The defoamer composition of claim 1, wherein said defoamer composition is free of waxes.

14. The defoamer composition of claim 1, wherein said defoamer composition is free of petroleum products.

15. A method to control foaming during a paper making process, said method comprising applying the defoamer composition of claim 1 to one or more locations in a paper making mill wherein said defoamer composition is applied to process waters present in said paper mill.

16. A method to control foaming in a pulp mill that includes at least one brown stock washer, wherein said method comprises applying the defoamer composition of claim 1 to the wet pulp, brown stock, shower water, and/or black liquor in the vicinity of the brown stock washer in an amount sufficient to control foaming during brown stock washing.

17. The method of claim 16, wherein said defoamer composition is applied at a dosage of from about 0.4 kg per metric ton of wet pulp to about 1 kg per metric ton of wet pulp.

* * * * *